United States Patent

Miwa

[11] Patent Number: 5,640,160
[45] Date of Patent: Jun. 17, 1997

[54] PULSE MODULATION METHOD

[75] Inventor: Kenichi Miwa, Tokyo, Japan

[73] Assignee: SMK Corporation, Tokyo, Japan

[21] Appl. No.: 557,347

[22] Filed: Nov. 14, 1995

[30] Foreign Application Priority Data

Nov. 15, 1994 [JP] Japan .................. 6-304177

[51] Int. Cl.$^6$ .................. H04Q 1/39; H03K 7/04
[52] U.S. Cl. .................. 341/53; 341/50; 375/237; 375/253
[58] Field of Search .................. 341/53, 50, 72, 341/74; 375/237, 253

[56] References Cited

U.S. PATENT DOCUMENTS

| | | | |
|---|---|---|---|
| 4,472,686 | 9/1984 | Nishimura et al. | 329/50 |
| 4,814,741 | 3/1989 | Hongo et al. | 340/825.65 |
| 4,931,751 | 6/1990 | Keller et al. | 32/108 |
| 4,931,790 | 6/1990 | Kobayashi et al. | 340/825.64 |
| 5,023,888 | 6/1991 | Bayston | 375/23 |
| 5,257,288 | 10/1993 | Moser | 375/25 |
| 5,475,381 | 12/1995 | Williamson et al. | 340/825.57 |
| 5,481,560 | 1/1996 | Potetz et al. | 375/238 |

*Primary Examiner*—Jeffrey A. Gaffin
*Assistant Examiner*—Peguy JeanPierre
*Attorney, Agent, or Firm*—Morrison Law Firm

[57] ABSTRACT

A binary code is divided into 2-bit data units. Pulse position modulation is performed on each unit rather than on each bit. Since a pulse is not formed for each bit, the transmission interval and transmission frame interval for the modulated signal is shortened, thus enabling high speed transmission. Since the pulse interval of the signal contains the information of the 2-bit data unit, only the leading edge of the pulse needs to be detected. This feature allows reliable demodulation even under adverse conditions such as a long-distance transmission route or a noisy transmission route. Since there is no need to demodulate by comparing each bit with an immediately preceding bit, complex demodulation schemes and decoding registers are not needed on the receiving side. Since the width of the pulse does not contain any transmission information, the pulse width is made as short as possible, thereby reducing battery consumption within the transmitter.

12 Claims, 9 Drawing Sheets

| FLAG | 2-BIT DATA | PULSE WIDTH | PULSE STOP INT.(Tr) | PULSE INT. (Tu) | WAVEFORM |
|---|---|---|---|---|---|
| NORMAL MODE | 00 | | | | |
| | 00 | t | t | 2t |  |
| | 01 | t | 2t | 3t |  |
| | 10 | t | 3t | 4t |  |
| | 11 | t | 4t | 5t |  |
| INVERSE MODE | 01 | | | | |
| | 00 | t | 4t | 5t |  |
| | 01 | t | 3t | 4t |  |
| | 10 | t | 2t | 3t |  |
| | 11 | t | t | 2t |  |

FIG.1(a)
FIG.1(b)
FIG.1(c)
FIG.1(d)
FIG.1(e)

| | FLAG | 2-BIT DATA | PULSE WIDTH | PULSE STOP INT.(Tr) | PULSE INT. (Tu) | WAVEFORM |
|---|---|---|---|---|---|---|
| NORMAL MODE | 00 | 00 | t | t | 2t | |
| | | 01 | t | 2t | 3t | |
| | | 10 | t | 3t | 4t | |
| | | 11 | t | 4t | 5t | |
| INVERSE MODE | 01 | 00 | t | 4t | 5t | |
| | | 01 | t | 3t | 4t | |
| | | 10 | t | 2t | 3t | |
| | | 11 | t | t | 2t | |

FIG.2

LOW-ORDER 2 BITS

| HIGH-ORDER 2 BITS | Tu | 00 (2t) | 01 (3t) | 10 (4t) | 11 (5t) |
|---|---|---|---|---|---|
| | 00 (2t) | 4t | 5t | 6t | 7t |
| | 01 (3t) | 5t | 6t | 7t | 8t |
| | 10 (4t) | 6t | 7t | 8t | 9t |
| | 11 (5t) | 7t | 8t | 9t | 10t |

| T2u | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | (4t) | (5t) | (5t) | (6t) | (6t) | (6t) | (7t) | (7t) | (7t) | (7t) | (8t) | (8t) | (8t) | (9t) | (9t) | (10t) |
| 0001 | (4t) | 8t | 9t | 9t | 10t | 10t | 10t | 11t | 11t | 11t | 11t | 12t | 12t | 12t | 13t | 13t | 14t |
| 0010 | (5t) | 9t | 10t | 10t | 11t | 11t | 11t | 12t | 12t | 12t | 12t | 13t | 13t | 13t | 14t | 14t | 15t |
| 0100 | (5t) | 9t | 10t | 10t | 11t | 11t | 11t | 12t | 12t | 12t | 12t | 13t | 13t | 13t | 14t | 14t | 15t |
| 0010 | (6t) | 10t | 11t | 11t | 12t | 12t | 12t | 13t | 13t | 13t | 13t | 14t | 14t | 14t | 15t | 15t | 16t |
| 0101 | (6t) | 10t | 11t | 11t | 12t | 12t | 12t | 13t | 13t | 13t | 13t | 14t | 14t | 14t | 15t | 15t | 16t |
| 1000 | (6t) | 10t | 11t | 11t | 12t | 12t | 12t | 13t | 13t | 13t | 13t | 14t | 14t | 14t | 15t | 15t | 16t |
| 0011 | (7t) | 11t | 12t | 12t | 13t | 13t | 13t | 14t | 14t | 14t | 14t | 15t | 15t | 15t | 16t | 16t | 17t |
| 0110 | (7t) | 11t | 12t | 12t | 13t | 13t | 13t | 14t | 14t | 14t | 14t | 15t | 15t | 15t | 16t | 16t | 17t |
| 1001 | (7t) | 11t | 12t | 12t | 13t | 13t | 13t | 14t | 14t | 14t | 14t | 15t | 15t | 15t | 16t | 16t | 17t |
| 1100 | (7t) | 11t | 12t | 12t | 13t | 13t | 13t | 14t | 14t | 14t | 14t | 15t | 15t | 15t | 16t | 16t | 17t |
| 0111 | (8t) | 12t | 13t | 13t | 14t | 14t | 14t | 15t | 15t | 15t | 15t | 16t | 16t | 16t | 17t | 17t | 18t |
| 1010 | (8t) | 12t | 13t | 13t | 14t | 14t | 14t | 15t | 15t | 15t | 15t | 16t | 16t | 16t | 17t | 17t | 18t |
| 1101 | (8t) | 12t | 13t | 13t | 14t | 14t | 14t | 15t | 15t | 15t | 15t | 16t | 16t | 16t | 17t | 17t | 18t |
| 1011 | (9t) | 13t | 14t | 14t | 15t | 15t | 15t | 16t | 16t | 16t | 16t | 17t | 17t | 17t | 18t | 18t | 19t |
| 1110 | (9t) | 13t | 14t | 14t | 15t | 15t | 15t | 16t | 16t | 16t | 16t | 17t | 17t | 17t | 18t | 18t | 19t |
| 1111 | (10t) | 14t | 15t | 15t | 16t | 16t | 16t | 17t | 17t | 17t | 17t | 18t | 18t | 18t | 19t | 19t | 20t |

HIGH-ORDER BITS (rows) / LOW-ORDER BITS (columns)

| | FLAG | 2-BIT DATA | PULSE WIDTH | COMPRESSED PULSE STOP INT(Trk)K=1/2 | PULSE INT. (Tu) | WAVEFORM |
|---|---|---|---|---|---|---|
| NORMAL MODE | 00 | 00 | t | tk = 0.5t | 1.5t |  |
| | | 01 | t | 2tk = t | 2t |  |
| | | 10 | t | 3tk = 1.5t | 2.5t |  |
| | | 11 | t | 4tk = 2t | 3t |  |
| INVERSE MODE | 01 | 00 | t | 4tk = 2t | 3t |  |
| | | 01 | t | 3tk = 1.5t | 2.5t |  |
| | | 10 | t | 2tk = t | 2t |  |
| | | 11 | t | tk = 0.5t | 1.5t |  |

| BIT DATA | PULSE WIDTH | PULSE STOP INTERVAL(Tr) | WAVEFORM |
|---|---|---|---|
| 0 | t | t | |
| 1 | t | 2t | |

PULSE MODULATION METHOD

BACKGROUND OF THE INVENTION

This invention concerns a pulse modulation method for pulse modulating binary codes, and in particular, a pulse modulation method used in an infrared communication device such as an IR module or remote control transceiver. Pulse-position modulation (PPM) is commonly used in remote control devices that control audiovisual equipment by infrared rays. PPM uses constant-amplitude, constant width pulses whose timings relative to a clock are proportional to sampled values of the modulating signal. In a digital signal, such as a binary code, direct conversion is used instead of sampling.

Referring to FIGS. 7(a)–7(c) and FIG. 8, an ID code and a data code, each consisting of an 8-bit word, are shown. The ID code, which is determined by the attributes of a controlled device (not shown), prevents misoperation with other devices. Devices meant to interoperate share identical ID codes. The data code is an encoding of the control data that controls the controlled device. In these codes, a pulse stop interval Tr, i.e., the interval between pulses, is determined by the value of each bit and is PPM-modulated into a signal such as that shown in FIG. 7(b).

Figure 8:
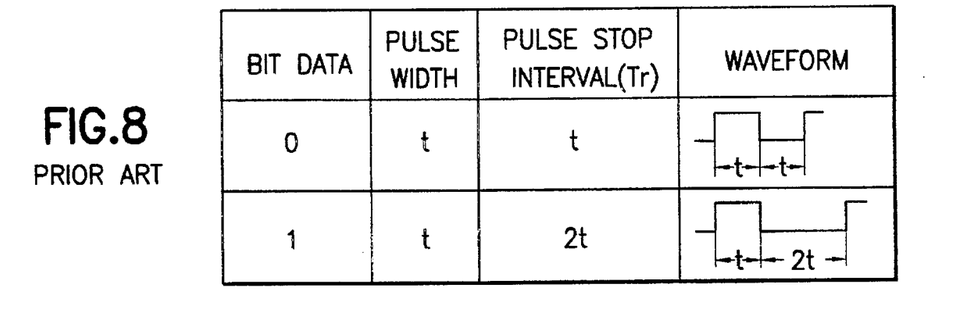
FIG. 8 is a modulation format diagram of a conventional pulse position modulation method according to the prior art.

Referring also to FIG. 8, when each bit is "0", a pulse of pulse width t is generated while pulse stop interval Tr is set to an interval that is the same as pulse width t. When the bit is "1", a pulse of pulse width t is generated while pulse stop interval Tr is set to an interval of 2t.

A header signal is added before this modulated signal. The header signal consists of a pulse of pulse width t and a 3t-long pulse stop interval Tr. An end signal, added after the modulated signal, consists of a pulse of pulse width t and a 5t-long pulse stop interval Tr, producing the PPM-modulated signal shown in FIG. 7(b). The header signal alerts the receiving circuitry to the beginning of the transmission and facilitates demodulating the modulated signal sent subsequently. The end signal signals the termination of the transmission of the modulated signal to the receiving circuitry. A transmission frame interval Tf is the length of time required to transmit the header signal followed by the ID code, the data code, and the end signal.

Figure 7A:
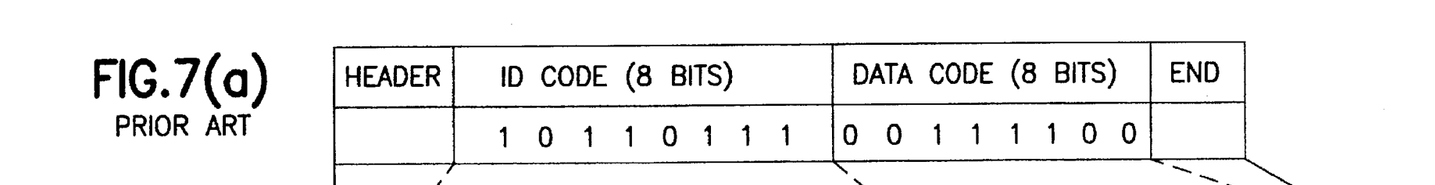
FIG. 7(a) is a waveform diagram showing a conventional pulse position modulation method according to the prior art.
Figure 7B:
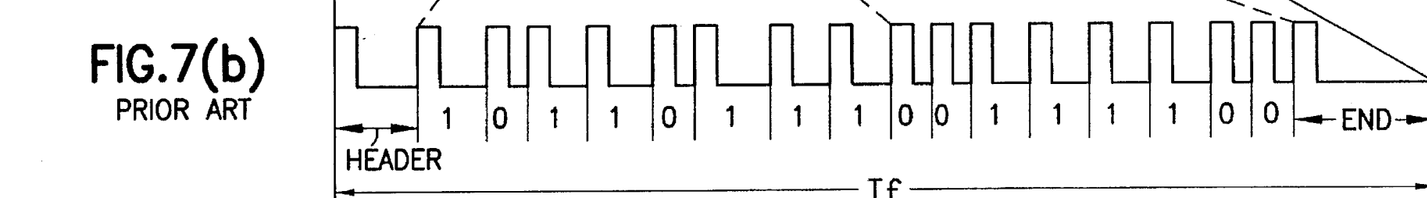
FIG. 7(b) is a waveform diagram showing a conventional pulse position modulation method according to the prior art.
Figure 7C:
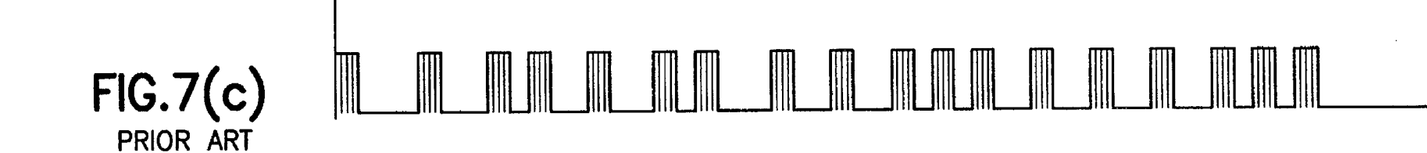
FIG. 7(c) is a waveform diagram showing a conventional pulse position modulation method according to the prior art.

In order to prevent mixing of signals with other devices and misoperation, this PPM-modulated signal is secondarily modulated by a carrier modulation wave of about 38 kHz as shown in FIG. 7(c) for sending via infrared to the controlled device.

Figure 9A:
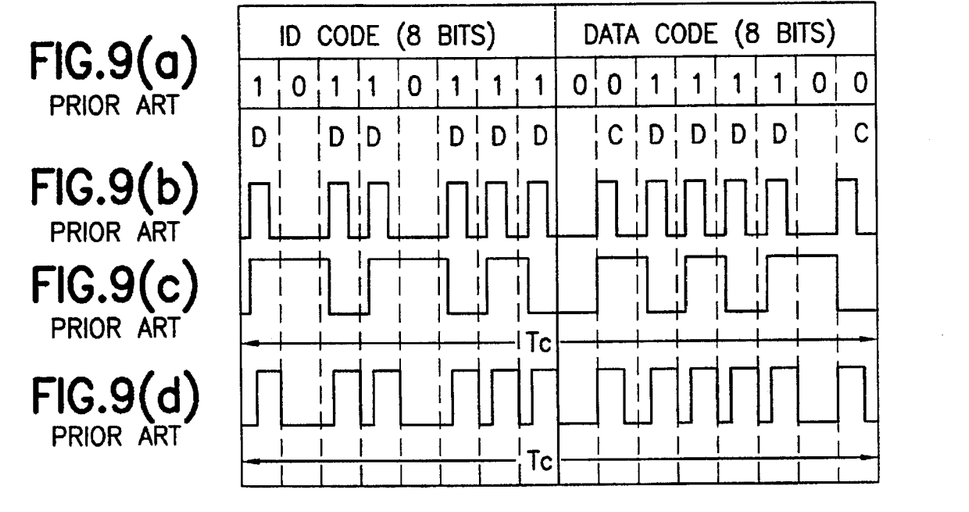
FIG. 9(a) is a waveform diagram of the conventional MFM modulation method and the pseudo-MFM modulation method according to the prior art.

Referring to FIGS. 9(a)–9(c), when bits are pulse-modulated for transmission at high speed, a modified frequency modulation (MFM) method is adopted. In this MFM modulation method, a pulse "D" is generated in the center of the bit cell when the bit is "1". When the next bit is "0", a clock pulse "C" is generated at the beginning of the second and subsequent bit cells, after which the signal is inverted in the position of the pulses "D" and clock pulses "C", producing the MFM-modulated signal shown in FIG. 9(c).

Referring to FIG. 9(d), a pseudo-MFM modulation method was developed by the applicant in which the pseudo-MFM modulation signal is created based on the MFM modulation signal generating a pulse waveform at the leading edge and trailing edge of the pulse. However, this method has the drawback that a single bit cannot be demodulated by itself, but must be demodulated by comparing it with the immediately preceding bit. As in the MFM modulation method, the pseudo-MFM method requires a register on the receiver side and complicates the demodulation algorithm.

Figure 10:
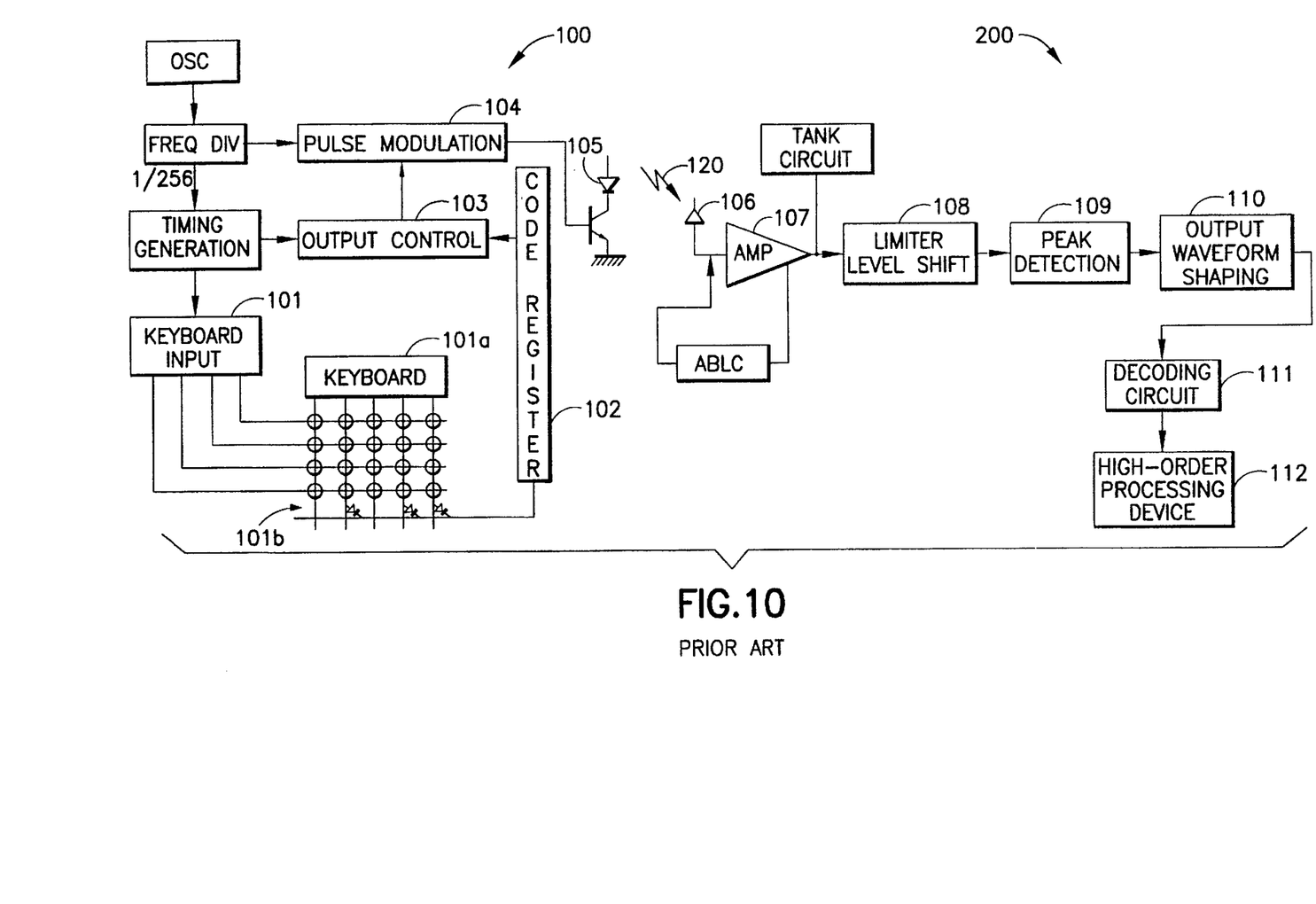
FIG. 10 is a block diagram of a transmitter and a receiver for transmitting and receiving a pulse modulation signal.

Referring to FIG. 10, a block diagram depicts a conventional transmitter 100 for sending control codes to a receiving device 200 via an infrared signal 120. A control code, called from a code register 102 by means of a keyboard 101a, a switch array 101b and a key input 101, is sent along with an ID code (not shown) to a pulse modulation circuit 104 via an output control circuit 103. In pulse modulation circuit 104, the control code/ID code is either PPM-modulated or MFM-modulated as described above. The modulated control code/ID code is secondarily modulated by the carrier frequency for transmission. An LED 105 is driven and controlled by this secondarily modulated signal to produce infrared signal 120.

An infrared PIN photodiode 106 in receiving device 200 senses infrared signal 120, performs a photoelectric conversion, and creates the received signal. The received signal is amplified by an amplifier 107, goes through a limiter level shift circuit 108, a peak detection circuit 109, and an output waveform shaping circuit 110, creating a received signal approximating FIG. 7(b) or FIG. 9(c). The bits from this received signal are demodulated by a decoding circuit 111 and sent to a high-order processing device 112 for controlling the controlled device.

Although the PPM modulation method makes demodulation easy, slow transmission speed is a problem since each bit necessarily contains pulse stop interval Tr. Transmission frame interval Tf becomes exceedingly long, thus increasing the required transmission time.

With the MFM modulation method, the unit (frame) transmission interval Tf is relatively short while the transmission speed is high. However, a single bit cannot be demodulated by itself and must be demodulated by comparing it to the immediately preceding bit. A receiving side code register is required and the demodulation algorithm is complicated, thereby requiring an expensive processor, whether software or hardware.

Figures 11A, 11B, 11C:
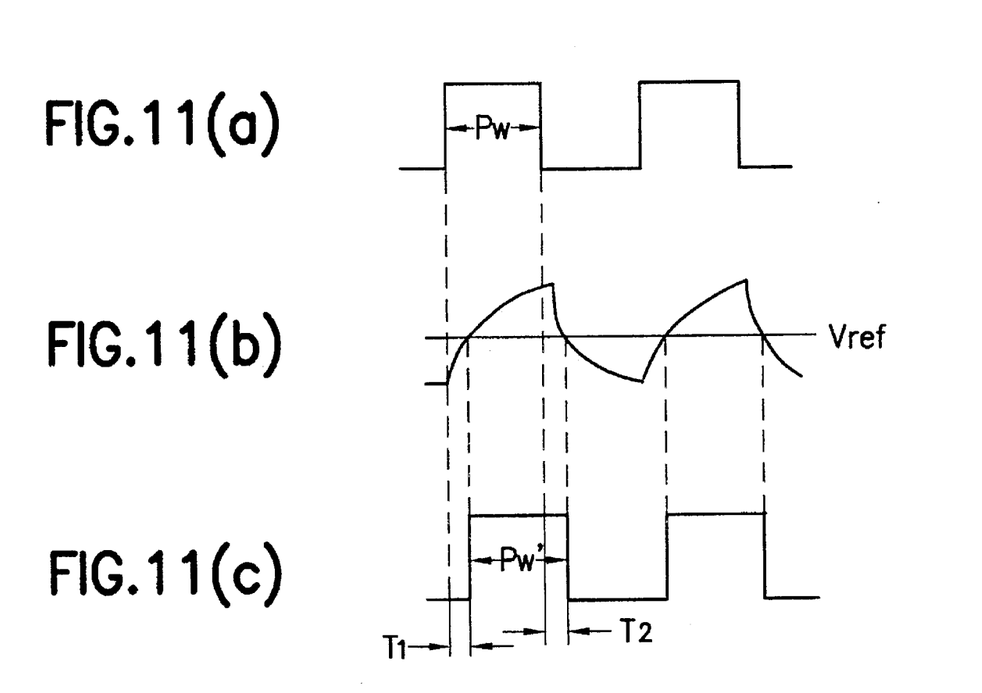
FIG. 11(a) is a time chart of the received signal in the receiver.
FIG. 11(b) is a time chart of the received signal in the receiver.
FIG. 11(c) is a time chart of the received signal in the receiver.

Referring to FIGS. 11(a) to 11(c), a rising time difference T1 and a falling time difference T2 are different in the infrared transmission pulse waveform. A pulse width PW' of the output signal whose waveform is shaped via a comparator is different from a pulse width PW of the original signal. Therefore, in the MFM modulation method, in which modulation is based on pulse width PW as well as on pulse stop interval Tr, demodulation errors are more likely to occur than with the PPM method.

Another problem with MFM is that it is subject to the effect of noise along the transmission route. As the infrared communication distance becomes greater, the transmission pulse waveform deteriorates, the pulse width PW changes similarly, and demodulation errors become more likely.

In addition, since on the transmitter side the transmission is done with a pulse train of a relatively long pulse width PW, a battery (not shown) easily runs down from driving LED 105, making the MFM method unsuitable for a portable device such as a remote control transmitter.

OBJECTS AND SUMMARY OF THE INVENTION

Therefore, an object of the present invention is to overcome the drawbacks and limitations of the prior art.

Another object of the present invention is to provide a pulse modulation method in which the transmission frame interval is relatively short compared with conventional PPM methods.

A further object of the present invention is to provide a pulse modulation method in which the transmission speed is relatively high compared with conventional PPM methods.

A still further object of the present invention is to provide a pulse modulation method in which the demodulation is easy compared with conventional PPM methods.

Briefly stated, a binary code is divided into 2-bit data units. Pulse position modulation is performed on each unit rather than on each bit. Since a pulse is not formed for each bit, the transmission interval and transmission frame interval for the modulated signal is shortened, thus enabling high speed transmission. Since the pulse interval of the signal contains the information of the 2-bit data unit, only the leading edge of the pulse needs to be detected. This feature allows reliable demodulation even under adverse conditions such as a long-distance transmission route or a noisy transmission route. Since there is no need to demodulate by comparing each bit with an immediately preceding bit, complex demodulation schemes and decoding registers are not needed on the receiving side. Since the width of the pulse does not contain any transmission information, the pulse width is made as short as possible, thereby reducing battery consumption within the transmitter.

According to an embodiment of the invention, a pulse modulation method for converting a binary code into a pulse-modulated signal includes partitioning the code into a plurality of units consisting of 2-bits each, generating a pulse of width t for each unit, setting a pulse stop interval for each unit corresponding to the 2-bits in the unit, and forming the pulse-modulated signal by separating each pulse from a succeeding pulse by the pulse stop interval.

According to an embodiment of the invention, a pulse modulation method for converting a binary code into a pulse-modulated signal includes partitioning the code into a plurality of units consisting of 2-bits each, generating a pulse of width t for each unit, setting a pulse stop interval for each unit corresponding to the 2-bits in the unit, compressing each pulse stop interval by a compression constant k to produce a compressed pulse stop interval, k being a positive number between zero and one, and forming the pulse-modulated signal by separating each pulse from a succeeding pulse by the compressed pulse stop interval.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is an explanatory diagram showing the threshold value X for 8-bit words.

FIG. 9(b) is a waveform diagram of the conventional MFM modulation method and the pseudo-MFM modulation method according to the prior art.

FIG. 9(c) is a waveform diagram of the conventional MFM modulation method and the pseudo-MFM modulation method according to the prior art.

FIG. 9(d) is a waveform diagram of the conventional MFM modulation method and the pseudo-MFM modulation method according to the prior art.

DETAILED DESCRIPTION OF THE PREFERRED EMBODIMENT

Figure 1A:
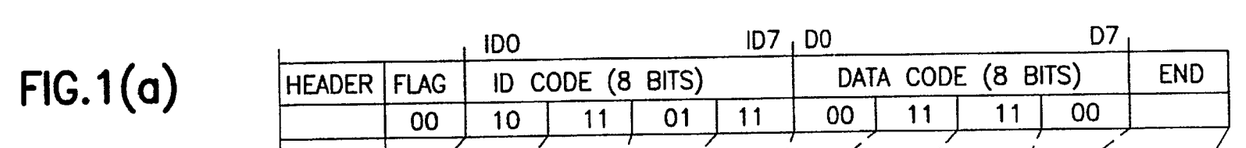
FIG. 1(a) is an example of the bit composition used to explain the pulse modulation method of the first embodiment of this invention.
Figure 1B:
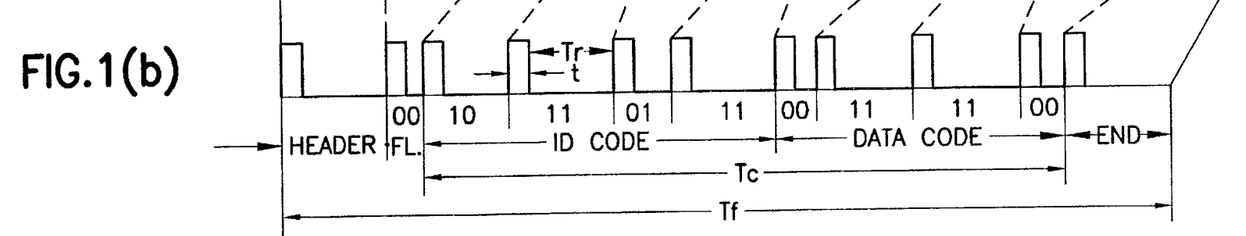
FIG. 1(b) shows a 2-bit PPM-modulated signal produced from the bits of FIG. 1(a).

Referring to FIGS. 1(a)–1(b), the bit content of the data word that is to be pulse-modulated by the method of the first embodiment of the present invention is shown. An ID code and a data code each consist of 8-bits. The ID code, which is determined by the attributes of a controlled device (not shown), prevents misoperation with other devices. Devices meant to interoperate share identical ID codes. The data code is an encoding of the control data that controls the controlled device. A flag code, consisting of 2-bits, is before the ID code and indicates inversion information of the data bits as described below. A header signal is added before the flag code to mark the beginning of the transmitted code modulated signal. An end signal, added after the code modulated signal, marks the end of the transmitted code modulated signal. A transmission frame interval Tf is the length of time required to transmit the header signal followed by the flag, ID code, data code, and end signal. A transmission interval Tc is the time required to transmit the ID code and the data code.

The 16 bits of the ID code and data code are separated into eight units of 2-bits each. Each 2-bit unit is pulse-modulated to produce a pulse of pulse width t and a pulse stop interval Tr whose width corresponds to the bit content of the unit. The code modulated signal shown in FIG. 1(b) is thus formed.

Figure 2:
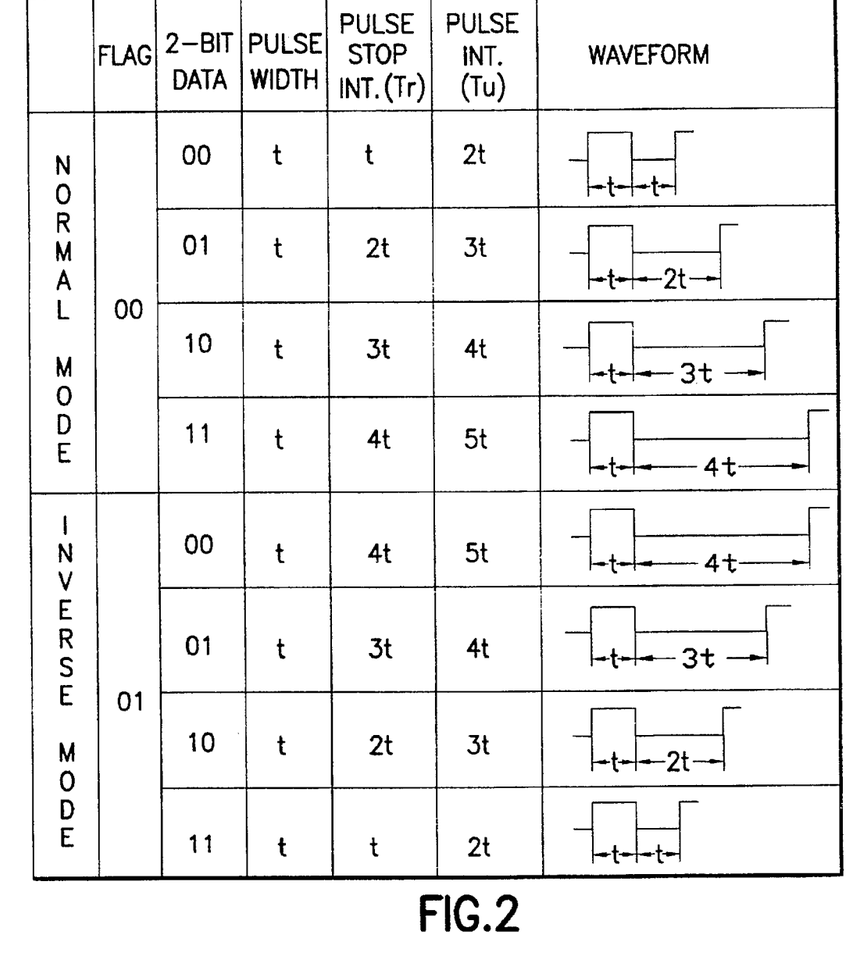
FIG. 2 is a modulation format diagram showing the pulse modulation method of the first embodiment.

Referring to FIG. 2, when the bit content of a 2-bit unit is (0,0), the pulse of pulse width t is generated and the pulse stop interval Tr is set to an interval of the same pulse width t. A pulse interval Tu is defined as the combination of the pulse and the pulse stop interval. When the bit content is (0,0), Tu=2t. When the bit content is (0,1), a pulse of pulse width t is generated, the pulse stop interval Tr is set to an interval of 2t, and Tu=3t. When the bit content is (1,0), a pulse of pulse width t is generated, the pulse stop interval Tr is set to an interval of 3t, and Tu=4t. When the bit content is (1,1), a pulse of pulse width t is generated, the pulse stop interval Tr is set to an interval of 4t, and Tu=5t.

The coding of the flag is performed the same way. If the bit content of the flag is (0,0), a pulse of width t is generated and the pulse stop interval Tr is set to an interval that is equal to the pulse width t. If the bit content of the flag is (0,1), a pulse of width t is generated and the pulse stop interval is set to 2t. The header signal consists of a pulse of pulse width t and a pulse stop interval Tr of 3t, while the end signal consists of a pulse of pulse width t and a pulse stop interval Tr of 5t.

Figure 1C:
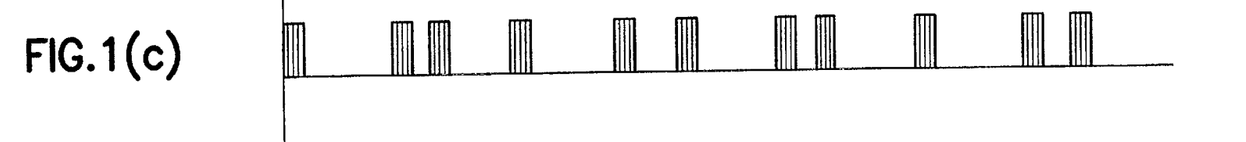
FIG. 1(c) shows the 2-bit PPM-modulated signal of FIG. 1(b) after secondary modulation.

Referring to FIG. 1(c), in order to prevent mixing signals with other devices and consequent misoperation, this 2-bit PPM-modulated signal is secondarily modulated by a carrier modulation wave of about 455 kHz and sent via infrared to the receiving device. Although amplitude-shift keying (ASK) is preferable, frequency-shift keying (FSK) and phase-shift keying (PSK) can alternatively be used. The advantages and disadvantages of these digital modulation methods are well known in the art and are not discussed further.

Because transmission frame interval Tf is shortened by this coding technique, thereby allowing high-speed transmission, the pulse width t required in conventional remote control transmitters is greatly shortened. The pulse width t is preferably set to 35 μsec.

The transmission interval Tc of the PPM modulated signal varies from 16t (0.56 msec) if all of the 2-bit units are (0,0) to 40t (1.4 msec) if all of the 2-bit units are (1,1). After adding the header signal (4t), flag signal (2t), and end signal (6t), the transmission frame interval Tf for the entire 2-bit PPM modulated signal varies between 28t to 52t.

Transmission interval Tc and transmission frame interval Tf vary depending on the bit contents of the 2-bit units of the code. If more of the bit contents of the eight 2-bit units are (0,0) or (0,1), Tc and Tf are relatively short. Conversely, if more of the bit contents of the eight 2-bit units are (1,0) or (1,1), Tc and Tf are relatively long. If transmission interval Tc exceeds a certain threshold value X, transmission interval Tc and transmission frame interval Tf are shortened by inverting the 16-bits in the ID code and the data code before encoding according to the normal mode of FIG. 2. A method for determining this threshold value is explained next.

Figure 3:
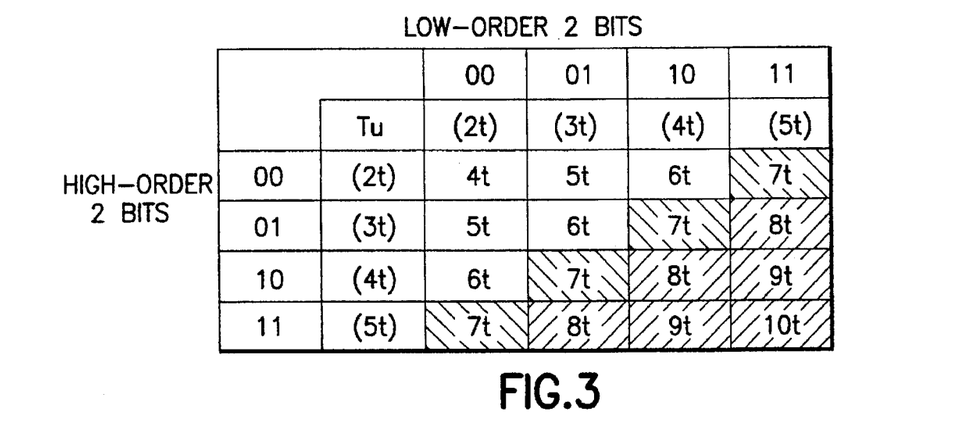
FIG. 3 is an explanatory diagram showing the threshold value X for 4-bit words.

Referring to FIG. 3, combinations of 2-bit units for a 4-bit data word are shown. The low-order 2-bits are across the top, while the high-order 2-bits are down the left. Pulse interval Tu is shown for each 2-bit unit and varies from 2t to 5t. Transmission interval Tc is the sum of the pulse intervals Tu for each 2-bit unit. For the combined 4-bit word, transmission interval Tc varies from 4t to 10t. That is, transmission interval Tc for (0,0,0,0) is 4t and for (1,1,1,1) is 10t.

The right-diagonal shaded cells in FIG. 3 show the 4-bit words for which transmission interval Tc would be shortened by inverting the 4-bit words. The left-diagonal shaded cells show the 4-bit words for which transmission interval Tc would not change even if the 4-bit words were inverted. Transmission interval Tc for these 4-bit words remains 7t whether the 4-bit word is inverted or not. Therefore, the threshold value is 7t for 4-bit words.

Referring to FIG. 4, combinations of 4-bit units for an 8-bit data word are shown. The low-order 4-bits are across the top, while the high-order 4-bits are down the left. A pulse interval T2u is shown for each 4-bit unit and varies from 4t to 10t. Note that the values for pulse interval T2u in FIG. 4 correspond to the values for transmission interval Tc in FIG. 3. In FIG. 4, transmission interval Tc is the sum of the pulse intervals T2u for each 4-bit unit. For the combined 8-bit word, transmission interval Tc ranges from 8t to 20t. That is, transmission interval Tc is 8t when all eight bits of the data word are zero and is 20t when all eight bits of the data word are one.

The right-diagonal shaded cells in FIG. 4 show the 8-bit words for which transmission interval Tc would be shortened by inverting the 8-bit words. The left-diagonal shaded cells show the 8-bit words for which transmission interval Tc would not change even if the 8-bit words were inverted. Transmission interval Tc for these 8-bit words remains 14t whether the 8-bit word is inverted or not. Therefore, the threshold value is 14t for 8-bit words.

The single-unit pulse interval Tu for a 4-bit word lies between 2t and 5t and has an average value of 3.5t. Since 4N-bit data words (where N is a positive integer) are divided into 2N units, the expected value of transmission interval Tc for a 4N-bit data word after pulse-modulation is 3.5t×2N= 7Nt. If N=1, this expected value is 7t. If N=2, this expected value is 14t. As seen from FIGS. 3 and 4, this expected value is the value of the threshold value X for 4N-bit data words.

Figure 1D:
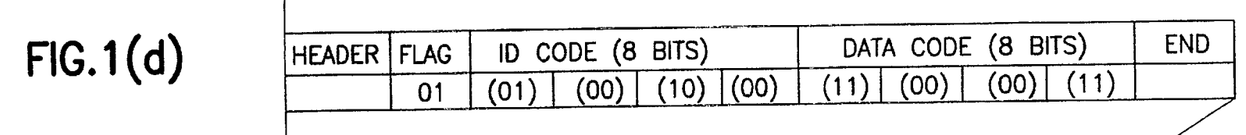
FIG. 1(d) shows the inverted bits of FIG. 1(a).

Extrapolating to a 16-bit data word, N=4 and the threshold value X is 28t. Therefore, if transmission interval Tc is greater than or equal to 29t, transmission interval Tc will be shortened by inverting all of the 16-bit data words. If the 16-bit data word consisting of the ID code and data code as shown in FIG. 1(a) is pulse-modulated using the normal mode of FIG. 2, transmission interval Tc is 31t. Since 31t exceeds the threshold value 28t, transmission interval Tc is shortened if the inversion flag is set from (0,0) to (0,1) and the bits in the 16-bit data word are inverted as shown in FIGS. 1(d) before being pulse-modulated using the normal mode of FIG. 2.

It is preferable not to use the normal mode of FIG. 2 after inverting the bits in the 16-bit data word. Instead, the 16-bit data word is pulse-modulated using the inverse mode shown in FIG. 2. If transmission interval Tc of the 16-bit data word in normal mode is equal to the threshold value, then pulse modulation may be done in either normal or inverse modes.

Figure 1E:
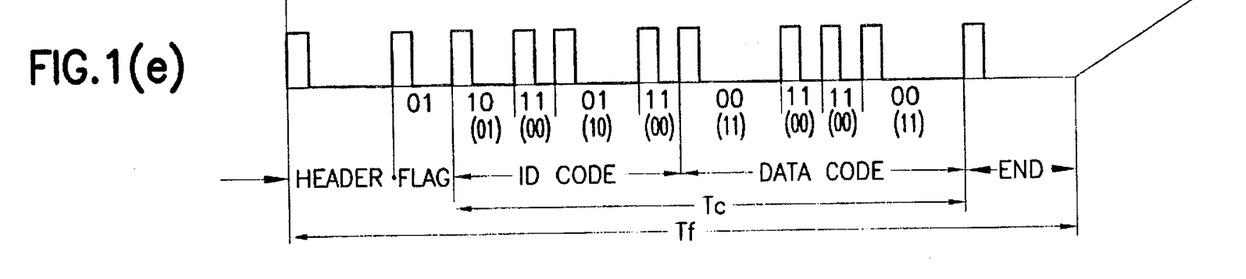
FIG. 1(e) shows an inverse 2-bit PPM-modulated signal produced from inverting the bits of FIG. 1(a) before using normal 2-bit PPM-modulation.

Referring now to FIG. 1(e), an inverted 2-bit PPM-modulated signal is shown resulting from pulse-modulating the code of FIG. 1(a) using the inverse mode of FIG. 2. If the 16-bit data word of FIG. 1(a) is pulse-modulated using the inverse mode of FIG. 2 due to the inversion flag being set to (0,1), transmission interval Tc is 25t instead of 31t as determined above. Using the inverse mode results in transmission interval Tc being shortened by 6t, that is, by 0.21 msec if pulse width t is set to 35 μsec. Since transmission interval Tc never exceeds the threshold value X, transmission interval Tc is shortened and transmission frame interval Tf is shortened even with the inversion flag added to the 16-bit data word.

In demodulating the signal which includes the inversion flag, the inversion flag is decoded using the normal mode of FIG. 2. If the inversion flag is (0,0), the remainder of the signal is demodulated using the normal mode of FIG. 2. If the inversion flag is (0,1), then the remainder of the signal is demodulated using the inverse mode of FIG. 2.

Referring to FIG. 2, the waveform for the normal mode may be used for the inverse mode and vice versa. In addition, the combinations of 2-bit data words (0,0), (0,1), (1,0), (1,1) with pulse intervals 1t, 2t, 3t, 4t are not limited to this embodiment but may be any other combination as long as redundancy is avoided.

Figure 5:
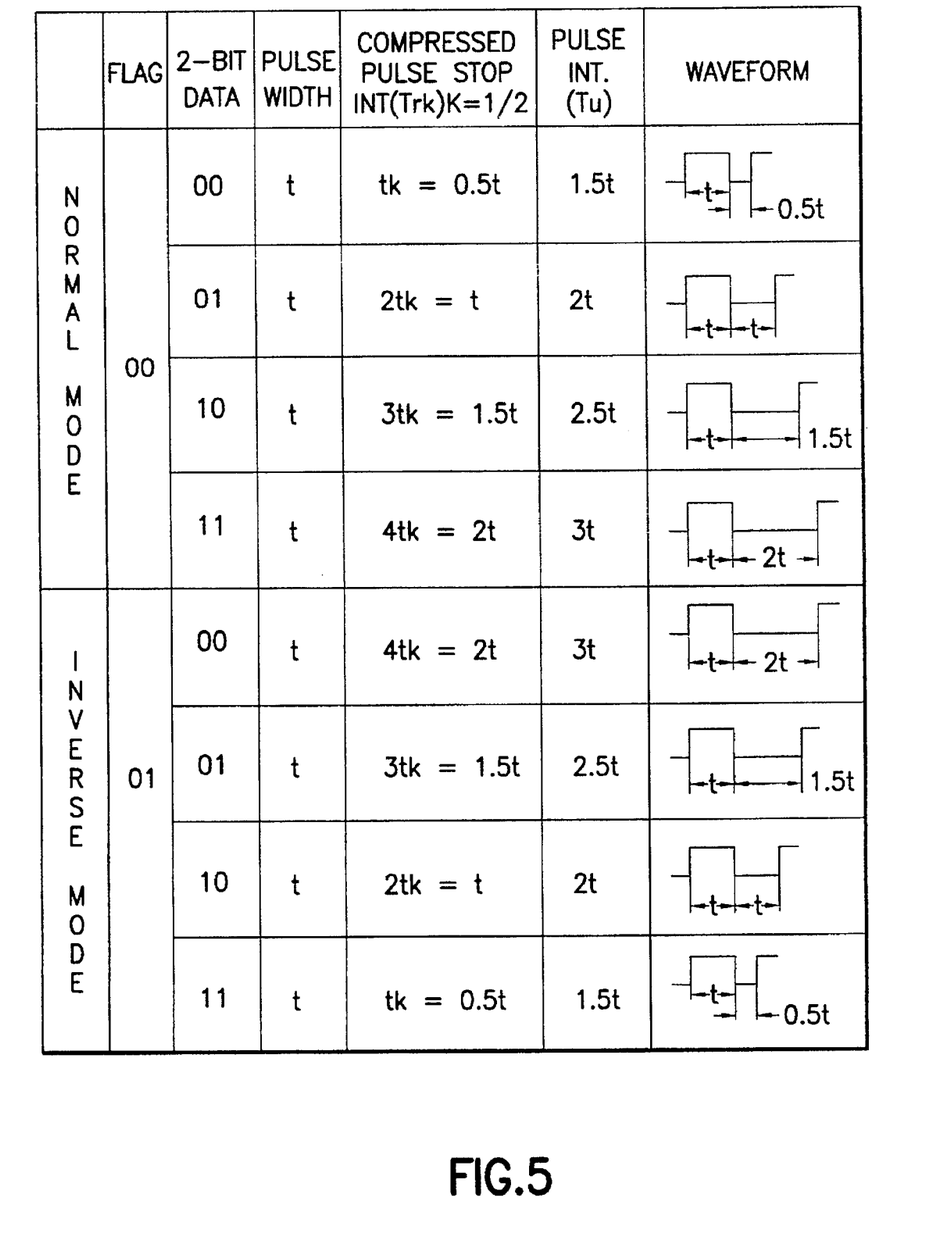
FIG. 5 is a modulation format diagram showing the pulse modulation method of the second embodiment.

Referring to FIG. 5, another embodiment of the present invention is shown in which the pulse stop interval Tr is not an integer multiple of the pulse width t. In order to further shorten the transmission interval Tc, pulse stop interval Tr is multiplied by a compression constant k, such as k=½, to produce a compressed pulse stop interval Trk. Although k can be any number between zero and one, preferably it is a value satisfying the equation $k=½^n$, where n is a positive integer. Pulse interval Tu, the sum of pulse width t and compressed pulse stop interval Trk, is thus shortened for each data unit.

In the normal mode shown in FIG. 5, applying compression constant k=½, compressed pulse stop interval Trk is 0.5t when the 2-bit word is (0,0), is 1t when the 2-bit word is (0,1), is 1.5t when the 2-bit word is (1,0), and is 2t when the 2-bit word is (1,1).

Figure 6A:
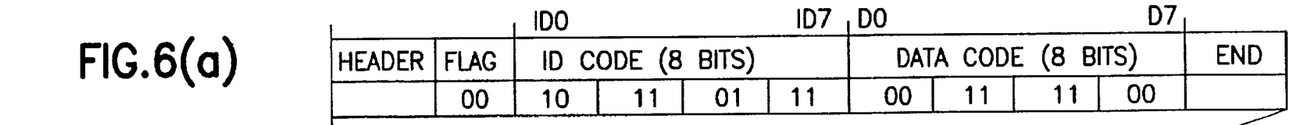
FIG. 6(a) is an example of the bit composition used to explain the pulse modulation method of the second embodiment of this invention.
Figure 6B:
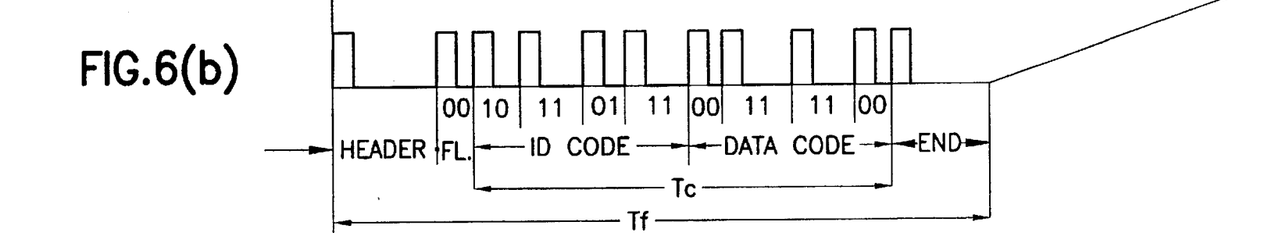
FIG. 6(b) shows a compressed 2-bit PPM-modulated signal produced from the bits of FIG. 6(a).
Figure 6C:
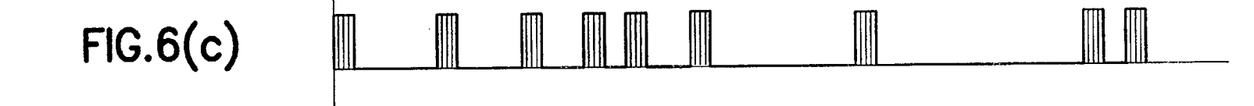
FIG. 6(c) shows compressed the 2-bit PPM modulated signal of FIG. 6(b) after secondary modulation.
Figure 6D:
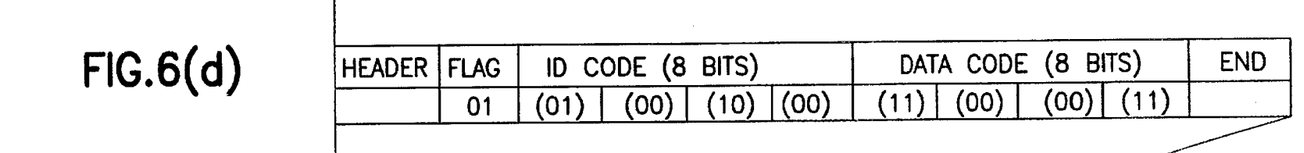
FIG. 6(d) shows the inverted bits of FIG. 6(a).

Referring also to FIGS. 6(a)–6(c), the data word of FIG. 6(a) has the same bit composition as the data word in FIG. 1(a). This data word is pulse-modulated using the normal mode of FIG. 5 to produce the 2-bit PPM modulated signal shown in FIG. 6(b). This 2-bit PPM modulated signal is secondarily modulated with a 455 kHz carrier wave to produce the signal shown in FIG. 6(c) for transmission to the receiver side by infrared rays.

Since pulse stop interval Tr is compressed to compressed pulse stop interval Trk, transmission interval Tc of the signal of FIG. 6(b) is 19.5t instead of 31t, a difference of 11.5t.

In this embodiment, as in the first embodiment, if the sum of the pulse intervals Tu for the units exceeds a threshold value Y, then transmission interval Tc is further shortened by inverting all the bits in the data word. If the sum of the compression pulse stop intervals Trk of the signal is equal to the threshold value, then pulse modulation may be done in either normal or inverse modes.

In FIG. 5, the compressed pulse stop interval Trk corresponding to each 2-bit unit is between tk and 4tk with an average value of 2.5tk. For 4N-bit data words, the expected value of the sum of the compressed pulse stop intervals Trk is 2N×2.5tk=5Ntk. This expected value is used as the threshold value Y. In this embodiment, since N=4 and k=½, Y=10t.

Figure 6E:
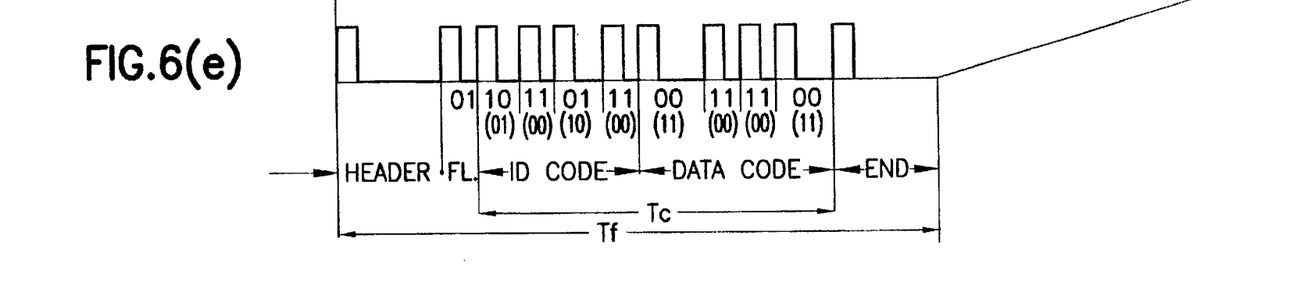
FIG. 6(e) shows a compressed inverse 2-bit PPM-modulated signal produced from inverting the bits of FIG. 6(a) before using normal compressed 2-bit PPM-modulation.

In the 2-bit PPM-modulated signal of FIG. 6(b), the sum of the compressed pulse stop intervals Trk of the data words is 11.5t. Since 11.5t exceeds the threshold value 10t, the inversion flag is set to (0,1) so that the 16-bit data word is pulse-modulated using the inverse mode of FIG. 5. FIG. 6(e) shows the inverted 2-bit PPM-modulated signal pulse-modulated in this manner. In this inverted 2-bit PPM-modulated signal, transmission interval Tc is 16.5t compared to the 19.5t if pulse-modulated using the normal mode, for a savings of 3t.

Since the sum of compressed stop intervals Trk never exceeds the threshold value Y, transmission interval Tc is shortened and never exceeds 2Nt+Y (with 16-bit data words, 18t). Transmission frame interval Tf is shortened even with the inversion flag added to the 16-bit data word.

In demodulating the modulated signal of this embodiment, in which pulse modulation adds an inversion flag, the pulse interval Tu of the inversion flag signal is decoded using the normal mode of FIG. 6. If the flag is (0,0), then the modulated code signal is demodulated using the normal mode of FIG. 5, while if the flag is (0,1), the modulated code signal is demodulated using the inverse mode of FIG. 5.

As with the first embodiment, the waveforms of the normal mode may be used for the inverse mode and vice versa. In addition, the association of 2-bit units (0,0), (0,1), (1,0), (1,1) with pulse intervals 0.5t, 1t, 1.5t, 2t is not limited to this combination but may be any other combination as long as redundancy is avoided.

TABLE 1

| Pulse Modulation Method | Header | Flag | End | Tc | Tf |
|---|---|---|---|---|---|
| PPM | 4 t | — | 6 t | 32 t–48 t | 42 t–58 t |
| MFM | 4 t | — | 4 t | 16 t | 24 t |
| Pseudo-MFM | 4 t | — | 4 t | 32 t | 40 t |
| 2-bit PPM | 4 t | — | 6 t | 16 t–40 t | 26 t–50 t |
| Inverse 2-bit PPM | 4 t | 2 t | 6 t | 16 t–28 t | 28 t–40 t |
| Compressed 2-bit PPM (k = ½) | 2.5 t | — | 3.5 t | 12 t–24 t | 18 t–30 t |
| Compressed Inverse 2-bit PPM (k = ½) | 2.5 t | 1.5 t | 3.5 t | 12 t–18 t | 19.5 t–25.5 t |

Table 1 compares transmission frame interval Tf in the cases where the code of the 16-bit data word is modulated by the pulse modulation methods of this invention and by conventional pulse modulation methods. Conventional pulse modulation methods are PPM, MFM, and pseudo-MFM. The methods of this invention include 2-bit PPM, inverse 2-bit PPM, compressed 2-bit PPM, and compressed inverse 2-bit PPM. The pulse width t of the pulse is the same for each pulse modulation method for the sake of comparison. The pulse width is usually made as short as possible while still allowing modulation and demodulation, but in the MFM modulation method, the pulse width t actually must be made longer than the pulse width t of the other methods because of the necessity to detect the leading and trailing edges of the pulse.

As is clear from the table, the pulse modulation methods of this invention allow a shorter transmission frame interval Tf and a higher transmission speed than does the PPM modulation method. Even when a 2-bit inversion flag signal is added in addition to the coded signal, the overall transmission frame period is shortened.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pulse modulation method for converting a binary code into a pulse-modulated signal, comprising:

partitioning said code into a plurality of units consisting of 2-bits each;

generating a pulse of width t for each unit;

setting a pulse stop interval for each unit corresponding to said 2-bits in said unit; and forming said pulse-modulated signal by separating each pulse from a succeeding pulse by said pulse stop interval.

2. A pulse modulation method as described in claim 1, further comprising:

setting said pulse stop interval to 1t when said 2-bits of said unit are (0,0);

setting said pulse stop interval to 2t when said 2-bits of said unit are (0,1);

setting said pulse stop interval to 3t when said 2-bits of said unit are (1,0); and setting said pulse stop interval to 4t when said 2-bits of said unit are (1,1).

3. A pulse modulation method as described in claim 2, further comprising:

determining a plurality of pulse intervals by combining each pulse and its associated pulse stop interval;

summing said plurality of pulse intervals to produce a sum;

adding an inversion flag to said pulse-modulated signal if said sum is greater than or equal to a number;

inverting each of said 2-bit units, if said sum is greater than or equal to said number, before the step of setting said pulse stop interval for each unit.

4. A pulse modulation method as described in claim 3, wherein:

said binary code consists of 4N-bits, where N is a positive integer; and said number equals one of 7Nt and (7N+1)t.

5. A pulse modulation method as described in claim 1, further comprising:

setting said pulse stop interval to 4t when said 2-bits of said unit are (0,0);

setting said pulse stop interval to 3t when said 2-bits of said unit are (0,1);

setting said pulse stop interval to 2t when said 2-bits of said unit are (1,0); and setting said pulse stop interval to 1t when said 2-bits of said unit are (1,1).

6. A pulse modulation method as described in claim 5, further comprising:

determining a plurality of pulse intervals by combining each pulse and its associated pulse stop interval;

summing said plurality of pulse intervals to produce a sum;

adding an inversion flag to said pulse-modulated signal if said sum is greater than or equal to a number;

inverting each of said 2-bit units, if said sum is greater than or equal to said number, before the step of setting said pulse stop interval for each unit.

7. A pulse modulation method as described in claim 6, wherein:

said binary code consists of 4N-bits, where N is a positive integer; and said number equals one of 7Nt and (7N+1)t.

8. A pulse modulation method for converting a binary code into a pulse-modulated signal, comprising:

partitioning said code into a plurality of units consisting of 2-bits each;

generating a pulse of width t for each unit;

setting a pulse stop interval for each unit corresponding to said 2-bits in said unit;

compressing each pulse stop interval by a compression constant k to produce a compressed pulse stop interval, k being a positive number between zero and one; and forming said pulse-modulated signal by separating each pulse from a succeeding pulse by said compressed pulse stop interval.

9. A pulse modulation method as described in claim 8, further comprising:

setting said compressed pulse stop interval to 1kt when said 2-bits of said unit are (0,0);

setting said compressed pulse stop interval to 2kt when said 2-bits of said unit are (0,1);

setting said compressed pulse stop interval to 3kt when said 2-bits of said unit are (1,0); and setting said compressed pulse stop interval to 4kt when said 2-bits of said unit are (1,1).

10. A pulse modulation method as described in claim 8, further comprising:

setting said compressed pulse stop interval to 4kt when said 2-bits of said unit are (0,0);

setting said compressed pulse stop interval to 3kt when said 2-bits of said unit are (0,1);

setting said compressed pulse stop interval to 2kt when said 2-bits of said unit are (1,0); and setting said compressed pulse stop interval to 1kt when said 2-bits of said unit are (1,1).

11. A pulse modulation method as described in claim 8, further comprising:

determining a plurality of pulse intervals by combining each pulse and its associated compressed pulse stop interval;

summing said plurality of compressed pulse intervals to produce a sum;

adding an inversion flag to said pulse-modulated signal if said sum is greater than or equal to a number;

inverting each of said 2-bit units, if said sum is greater than or equal to said number, before the step of setting said compressed pulse stop interval for each unit.

12. A pulse modulation method as described in claim 11, wherein:

said binary code consists of 4N-bits, where N is a positive integer;

said compression constant k equals one half; and said number equals one of 5Nt and (5N+1)t.

* * * * *